United States Patent
Jiang et al.

(10) Patent No.: US 10,118,157 B2
(45) Date of Patent: Nov. 6, 2018

(54) PREPARATION METHOD, PRODUCT, AND APPLICATION OF IRON-COBALT FENTON-LIKE CATALYST

(71) Applicant: CHINESE RESEARCH ACADEMY OF ENVIRONMENTAL SCIENCES, Beijing (CN)

(72) Inventors: Jinyuan Jiang, Beijing (CN); Yuexi Zhou, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 258 days.

(21) Appl. No.: 15/031,273

(22) PCT Filed: Oct. 24, 2014

(86) PCT No.: PCT/CN2014/089420
§ 371 (c)(1),
(2) Date: Apr. 22, 2016

(87) PCT Pub. No.: WO2015/062449
PCT Pub. Date: May 7, 2015

(65) Prior Publication Data
US 2016/0271591 A1    Sep. 22, 2016

(30) Foreign Application Priority Data
Oct. 31, 2013  (CN) .......................... 2013 1 0533050

(51) Int. Cl.
*B01J 23/75*   (2006.01)
*B01J 35/00*   (2006.01)
(Continued)

(52) U.S. Cl.
CPC .............. *B01J 23/75* (2013.01); *B01J 37/06* (2013.01); *B01J 37/16* (2013.01); *C02F 1/66* (2013.01);
(Continued)

(58) Field of Classification Search
CPC ........ B01J 23/75; B01J 35/0013; B01J 37/06; B01J 37/16; C02F 1/66; C02F 1/722;
(Continued)

(56) References Cited

U.S. PATENT DOCUMENTS

2010/0125036 A1*  5/2010  Sharma .................... B01J 23/40
                                                              502/330

FOREIGN PATENT DOCUMENTS

CN       102744069       10/2012
KR       20010054098     7/2001

OTHER PUBLICATIONS

Machine translation of CN 102744069A (2012) (obtained from google Mar. 2018).*

(Continued)

*Primary Examiner* — Lucas A Stelling

(57) ABSTRACT

A preparation method of an iron-cobalt fenton-like catalyst includes steps of: adopting $FeCl_2 \cdot 4H_2O$ and $CoCl_2 \cdot 6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining a product of the iron-cobalt fenton-like catalyst. The iron-cobalt fenton-like catalyst has a fast reaction, a relatively high treatment efficiency and a relatively wide adaptability. Moreover, an application of the iron-cobalt fenton-like catalyst in an industrial wastewater treatment is provided.

13 Claims, 1 Drawing Sheet

(51) Int. Cl.
  *B01J 37/06*    (2006.01)
  *B01J 37/16*    (2006.01)
  *C02F 1/66*     (2006.01)
  *C02F 1/72*     (2006.01)
  *C02F 103/36*   (2006.01)
  *C02F 103/38*   (2006.01)

(52) U.S. Cl.
  CPC .............. *C02F 1/722* (2013.01); *C02F 1/725* (2013.01); *B01J 35/0013* (2013.01); *C02F 2103/36* (2013.01); *C02F 2103/365* (2013.01); *C02F 2103/38* (2013.01); *C02F 2305/026* (2013.01)

(58) Field of Classification Search
  CPC ........................... C02F 1/725; C02F 2103/36; C02F 2103/365; C02F 2103/38; C02F 2305/026
  See application file for complete search history.

(56) References Cited

OTHER PUBLICATIONS

Yujin Chen et al., Fe—Co bimetallic alloy nanoparticles as a highly active peroxidase mimetic and its application in biosensing, Chem. Commun., vol. 49, Apr. 11, 2013, pp. 5013-5015.

Regina C.C. Costa et al., Novel active heterogeneous Fenton system based on Fe3-xMxO4 (Fe, Co, Mn, Ni): The role of M2+ species on the reactivity towards H2O2 reactions, Journal of Hazardous Materials, vol. 129, 2006, pp. 171-178.

* cited by examiner

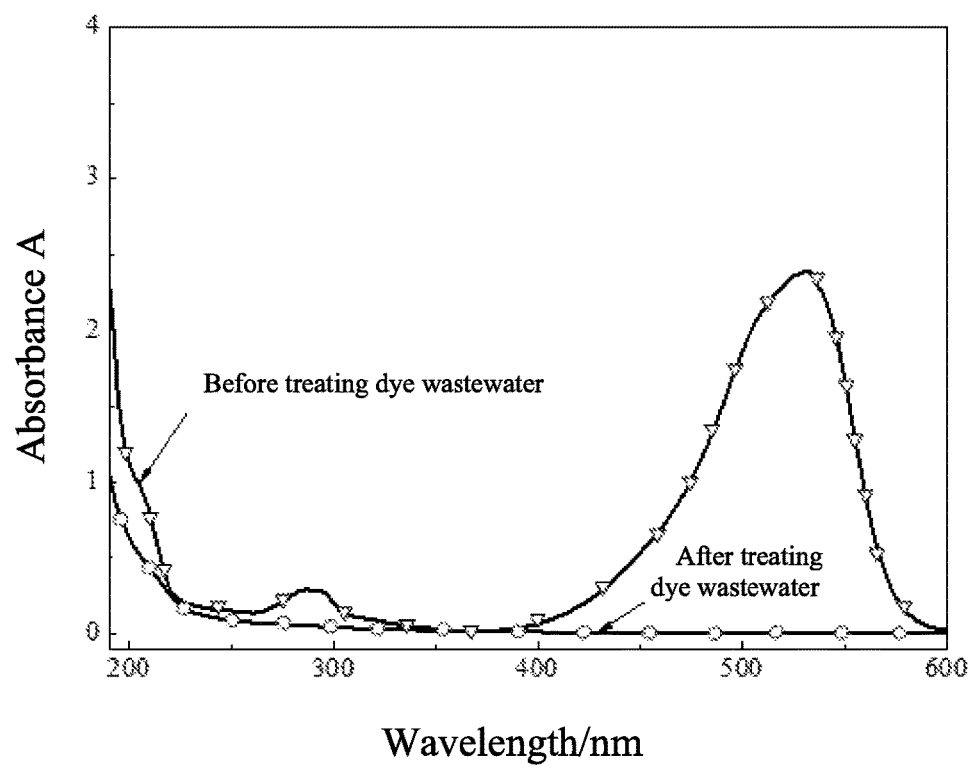

PREPARATION METHOD, PRODUCT, AND APPLICATION OF IRON-COBALT FENTON-LIKE CATALYST

CROSS REFERENCE OF RELATED APPLICATION

This is a U.S. National Stage under 35 U.S.C 371 of the International Application PCT/CN2014/089420, filed Oct. 24, 2014, which claims priority under 35 U.S.C. 119(a-d) to CN 201310533050.1, filed Oct. 31, 2013.

BACKGROUND OF THE PRESENT INVENTION

Field of Invention

The present invention relates to a catalyst, and more particularly to an iron-cobalt fenton-like catalyst, and a preparation method, a product, and an application thereof.

Description of Related Arts

In recent years, with the municipal domestic wastewater being effectively treated, the industrial wastewater treatment has become the primary problem of the water treatment, and the non-degradable industrial wastewater treatment is recognized as the wastewater treatment difficulty in the industry. With the fast development of the chemical industry in China, various chemical products are applied into every walk of life. The organic pollutants in the wastewater of the heavily-polluting industries, such as the pharmacy industry, the chemical industry, and printing and dyeing industry, have the high concentration, the stable structure and the poor biodegradability. The wastewater treated by the conventional technology is failed to reach the emission standard and the treatment cost of the wastewater is high, which brings heavy pressures on the energy conservation and emission reduction of the enterprises and heavily pollutes the water environment. Thus, it is necessary to develop a highly-efficient industrial wastewater treatment technology, so as to increase the removal rate of $COD_{Cr}$ in the wastewater for the wastewater reaching the effluent emission standard and being transformed into resources.

Since 1894, because the fenton reaction has the significant effect on degrading the multiple persistent toxic organic pollutants in the wastewater, the fenton reaction has attracted worldwide attentions in the field of organic wastewater treatment. The conventional fenton technology is a catalytic reaction which utilizes $Fe^{2+}$ to react with $H_2O_2$ for generating .OH having an extremely high oxidability. The .OH is able to completely degrade the toxic organics in the wastewater into substances of $CO_2$, $H_2O$, and organic salt. Meanwhile, the conventional fenton technology has problems of a pH limit, a secondary pollution caused by the products of the conventional fenton technology, and a low $H_2O_2$ utilization. With the further research and the technology development, multiple fenton-like technologies are developed based on the conventional fenton technology, such as a modified-fenton method, a photo-fenton method, an electro-fenton method, an ultrasonic-fenton method, a microwave-fenton method, and a zerovalent-iron-fenton method. During research, it is found that the above fenton-like technologies are able to solve the specific existing problems of the conventional fenton technology, and to reduce the usage of the iron resource and the hydrogen peroxide, so as to achieve a more efficient and more economical treatment effect. However, the introduction of the ultraviolet light, the microwave, and the ultrasonic leads to the high energy consumption and the high lost. Thus, during the fenton-like reaction, while increasing the reaction speed and the treatment effect, and reducing the energy consumption and the cost, how to reduce the addition amount of the iron resource and the hydrogen peroxide is greatly important.

SUMMARY OF THE PRESENT INVENTION

An object of the present invention is to provide a water treatment agent which has a fast reaction, a relatively high treatment efficiency and a relatively wide adaptability, namely an iron-cobalt fenton-like catalyst, and a preparation method thereof.

Another object of the present invention is to provide an application of the iron-cobalt fenton-like catalyst in the industrial wastewater pretreatment and advanced treatment.

A preparation method of an iron-cobalt fenton-like catalyst comprises steps of: adopting $FeCl_2.4H_2O$ and $CoCl_2.6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining a product.

Preferably, the preparation method of the iron-cobalt fenton-like catalyst comprises steps of: respectively preparing aqueous solutions of the $FeCl_2.4H_2O$ and the $CoCl_2.6H_2O$, wherein a molar concentration ratio of $Fe^{2+}$ to $Co^{2+}$ is 1:1-10:1, and adding 2-10 ml of the surface protecting agent of the PVP having a concentration of 5 g/L, so as to obtain a first mixed solution I; weighing 100 ml of deionized water, adding NaOH into the deionized water for adjusting a pH value of the deionized water to 11.0-12.0, and then adding 1-5 g of the $KBH_4$ to prepare a second mixed solution II; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, continue stirring for 10-40 min, and aging for 0.5-2 h; and, after suction filtration, washing, and vacuum drying, obtaining a Fe—Co alloy, namely the product.

The product obtained by the preparation method provided by the present invention is the iron-cobalt fenton-like catalyst.

An application of the iron-cobalt fenton-like catalyst in an industrial wastewater treatment is described as follows.

A method for treating industrial wastewater with the iron-cobalt fenton-like catalyst comprises steps of:

(1) collecting a wastewater sample to be treated, and adjusting a pH value of the wastewater sample to 2.0±0.1;

(2) adding an $H_2O_2$ solution having a content of 30% into the wastewater sample, and then adding the iron-cobalt fenton-like catalyst into the wastewater sample, so as to obtain a mixed solution;

(3) fully reacting the mixed solution with a stirring speed controlled at 200-400 r/min for 5-20 min, and controlling a pH value of the mixed solution at a range of 2.0±0.5 during reacting;

(4) adjusting a pH value of a reacted solution to being larger than or equal to 10.0, and heating an adjusted solution in a water bath at a temperature of 50° C. for 1 h; and (5) adjusting a pH value of a heated solution to 7.0, and staying for precipitating, wherein a supernatant of a precipitated solution is a treated effluent; wherein:

in the step (2), a volume ratio of the wastewater sample to the $H_2O_2$ solution is 500:1-1000:1, and a mass ratio of the iron-cobalt fenton-like catalyst to the $H_2O_2$ solution is 5:1-10:1; and the industrial wastewater is acrylon wastewater, dye wastewater, petrochemical wastewater, phenol-acetone production wastewater, acrylonitrile butadiene styrene (ABS) synthetic resin wastewater, or acrylic acid production wastewater.

Compared with prior arts, the iron-cobalt fenton-like catalyst and the preparation method thereof, provided by the present invention, have following advantages.

1. Relatively Fast Treatment Speed

When treating the industrial wastewater with the catalyst provided by the present invention, a relatively good treatment effect is achieved in a 10-min reaction time.

2. Relatively High Treatment Efficiency

When treating the industrial wastewater with the water treatment agent provided by the present invention, a removal rate of $COD_{Cr}$ in the acrylon wastewater with the advanced treatment is above 60%, and the removal rate of the $COD_{Cr}$ in the self-prepared dye wastewater is above 70%.

3. Wide Application Range

The catalyst is applicable for not only the advanced treatment of the acrylon wastewater and the dye wastewater, but also the pretreatment and the advanced treatment of the petrochemical wastewater, the phenol-acetone production wastewater, the ABS synthetic resin wastewater and the acrylic acid production wastewater.

BRIEF DESCRIPTION OF THE DRAWINGS

The FIGURE is a sketch view of measured results of a wastewater absorbance before and after treating according to a second preferred embodiment of the present invention.

DETAILED DESCRIPTION OF THE PREFERRED EMBODIMENT

Example 1

A preparation method of an iron-cobalt fenton-like catalyst comprises steps of: weighing a certain amount of $FeCl_2 \cdot 4H_2O$ and $CoCl_2 \cdot 6H_2O$, and preparing aqueous solutions respectively having a $Fe^{2+}$ concentration of 0.5 mol/L and a $Co^{2+}$ concentration of 0.5 mol/L; respectively putting 100 ml of the two aqueous solutions into a three-necked flask, and adding 8 ml of a surface protecting agent of polyvinyl pyrrolidone (PVP) having a concentration of 5 g/L into the three-necked flask, so as to obtain a first mixed solution I; adding 2 g of $KBH_4$ into 100 ml of an NaOH aqueous solution having a pH value of 11.0-12.0, so as to prepare a second mixed solution II; dropping the second mixed solution II into the three-necked flask for mixing with the first mixed solution I with a reaction temperature controlled at 50° C., a dropping speed controlled at 30 r/min by a peristaltic pump, and a stirring speed controlled at 600 r/min by a mechanical stirrer, and then generating a black precipitate; after finishing dropping the second mixed solution II of the $KBH_4$ and NaOH, continue stirring for 20 min, and aging for 1 h; and, after suction filtration, washing, and vacuum drying, obtaining a product of the iron-cobalt fenton-like catalyst.

An advanced treatment method for an acrylon biochemical effluent with the catalyst obtained by the above preparation method comprises steps of:

(1) collecting 400 ml of a water sample to be treated which is raw water of the acrylon biochemical effluent having a pH value of 6.8-7.5, and adjusting the pH value of the water sample to 2.0 with an $H_2SO_4$ solution;

(2) firstly adding 0.5 ml of an $H_2O_2$ solution having a content of 30% into the water sample, and then adding 1.1472 g of the iron-cobalt fenton-like catalyst into the water sample, so as to obtain a first mixed solution;

(3) stirring the first mixed solution with a stirring speed of 200 r/min, controlling a pH value of the first mixed solution at a range of 2.0±0.5 with the $H_2SO_4$ solution during reacting, and reacting for 10 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent and a $COD_{Cr}$ value in the water sample before and after treating is showed in Table 1.

TABLE 1

| Quality of water sample before and after treating | | |
|---|---|---|
| | $COD_{Cr}$ (mg/L) | $COD_{Cr}$ removal rate (%) |
| Before treating | 232.6 | |
| After treating | 86.1 | 63.0 |

Example 2

A preparation method of an iron-cobalt fenton-like catalyst comprises steps of: weighing a certain amount of $FeCl_2 \cdot 4H_2O$ and $CoCl_2 \cdot 6H_2O$, and preparing aqueous solutions respectively having a $Fe^{2+}$ concentration of 0.5 mol/L and a $Co^{2+}$ concentration of 0.05 mol/L; respectively putting 100 ml of the two aqueous solutions into a three-necked flask, and adding 10 ml of a surface protecting agent of PVP having a concentration of 5 g/L into the three-necked flask; adding 1 g of $KBH_4$ into 100 ml of an NaOH aqueous solution having a pH value of 11.0-12.0, so as to prepare a mixed solution; dropping the mixed solution into the three-necked flask with a reaction temperature controlled at 45° C., a dropping speed controlled at 15 r/min by a peristaltic pump, and a stirring speed controlled at 400 r/min by a mechanical stirrer, and then generating a black precipitate; after finishing dropping the mixed solution of the $KBH_4$ and NaOH, continue stirring for 10 min, and aging for 2 h; and, after suction filtration, washing, and vacuum drying, obtaining a product of the iron-cobalt fenton-like catalyst.

A method for treating dye wastewater with the product obtained by the above preparation method comprises steps of:

(1) preparing Basic Red 46 dye wastewater which has a concentration of 200 mg/L and a pH value of 4.0-4.5, weighing 400 ml of the Basic Red 46 dye wastewater to serve as a water sample, and adjusting a pH value of the water sample to 2.1 with an $H_2SO_4$ solution;

(2) firstly adding 0.8 ml of an $H_2O_2$ solution having a content of 30% into the water sample, and then adding 2.6960 g of the iron-cobalt fenton-like catalyst into the water sample, so as to obtain a first mixed solution;

(3) fully mixing the first mixed solution with a stirring speed controlled at 400 r/min, controlling a pH value of the first mixed solution at a range of 2.0±0.5 with the $H_2SO_4$ solution during reacting, and reacting for 20 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent; a change of a $COD_{Cr}$ value in the water sample before and after treating is showed in Table 2; and measured results of an absorbance of the water sample before and after treating are showed in the FIGURE.

TABLE 2

Quality of water sample before and after treating

|  | $COD_{Cr}$ (mg/L) | $COD_{Cr}$ removal rate (%) |
|---|---|---|
| Before treating | 272.6 |  |
| After treating | 71.2 | 73.88 |

Example 3

A preparation method of an iron-cobalt fenton-like catalyst comprises steps of: weighing a certain amount of $FeCl_2.4H_2O$ and $CoCl_2.6H_2O$, and preparing aqueous solutions respectively having a $Fe^{2+}$ concentration of 0.5 mol/L and a $Co^{2+}$ concentration of 0.1 mol/L; respectively putting 100 ml of the two aqueous solutions into a three-necked flask, and adding 2 ml of a surface protecting agent of PVP having a concentration of 5 g/L into the three-necked flask; adding 5 g of $KBH_4$ into 100 ml of an NaOH aqueous solution having a pH value of 11.0-12.0, so as to prepare a mixed solution; dropping the mixed solution into the three-necked flask with a reaction temperature controlled at 55° C., a dropping speed controlled at 50 r/min by a peristaltic pump, and a stirring speed controlled at 900 r/min by a mechanical stirrer, and then generating a black precipitate; after finishing dropping the mixed solution of the $KBH_4$ and NaOH, continue stirring for 40 min, and aging for 0.5 h; and, after suction filtration, washing, and vacuum drying, obtaining a product of the iron-cobalt fenton-like catalyst.

An advanced treatment method for petrochemical industry park wastewater with the product obtained by the above preparation method comprises steps of:

(1) weighing 400 ml of a water sample to be treated which is petrochemical wastewater having a pH value of 6.0-7.0, and adjusting a pH value of the water sample to 2.0 with an $H_2SO_4$ solution;

(2) firstly adding 0.4 ml of an $H_2O_2$ solution having a content of 30% into the water sample, and then adding 0.6740 g of the iron-cobalt fenton-like catalyst into the water sample, so as to obtain a first mixed solution;

(3) fully mixing the first mixed solution with a stirring speed controlled at 300 r/min, controlling a pH value of the first mixed solution at a range of 2.0±0.5 with the $H_2SO_4$ solution during reacting, and reacting for 5 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent and a change of a $COD_{Cr}$ value in the water sample before and after treating is showed in Table 3.

TABLE 3

Quality of water sample before and after treating

|  | $COD_{Cr}$ (mg/L) | $COD_{Cr}$ removal rate (%) |
|---|---|---|
| Before treating | 67.6 |  |
| After treating | 29.1 | 57.0 |

Example 4

A preparation method of an iron-cobalt fenton-like catalyst comprises steps of: weighing a certain amount of $FeCl_2.4H_2O$ and $CoCl_2.6H_2O$, and preparing aqueous solutions respectively having a $Fe^{2+}$ concentration of 0.5 mol/L and a $Co^{2+}$ concentration of 0.25 mol/L; respectively putting 100 ml of the two aqueous solutions into a three-necked flask, and adding 5 ml of a surface protecting agent of PVP having a concentration of 5 g/L into the three-necked flask; adding 4 g of $KBH_4$ into 100 ml of an NaOH aqueous solution having a pH value of 11.0-12.0, so as to prepare a mixed solution; dropping the mixed solution into the three-necked flask with a reaction temperature controlled at 50° C., a dropping speed controlled at 40 r/min by a peristaltic pump, and a stirring speed controlled at 800 r/min by a mechanical stirrer, and then generating a black precipitate; after finishing dropping the mixed solution of the $KBH_4$ and NaOH, continue stirring for 30 min, and aging for 1.5 h; and, after suction filtration, washing, and vacuum drying, obtaining a product of the iron-cobalt fenton-like catalyst.

A method for pretreating phenol-acetone production wastewater with the product obtained by the above preparation method comprises steps of:

(1) weighing 400 ml of a water sample to be treated which is the phenol-acetone production wastewater having a pH value of about 12.0, and adjusting a pH value of the water sample to 1.9 with an $H_2SO_4$ solution;

(2) firstly adding 0.67 ml of an $H_2O_2$ solution having a content of 30% into the water sample, and then adding 1.8603 g of the iron-cobalt fenton-like catalyst into the water sample, so as to obtain a first mixed solution;

(3) fully mixing the first mixed solution with a stirring speed controlled at 200 r/min, controlling a pH value of the first mixed solution at a range of 2.0±0.5 with the $H_2SO_4$ solution during reacting, and reacting for 10 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent and a change of a $COD_{Cr}$ value in the water sample before and after treating is showed in Table 4.

TABLE 4

Quality of water sample before and after treating

| | $COD_{Cr}$ (mg/L) | $COD_{Cr}$ removal rate (%) |
|---|---|---|
| Before treating | 2326 | |
| After treating | 1352 | 41.9 |

Example 5

A preparation method of an iron-cobalt fenton-like catalyst comprises steps of: weighing a certain amount of $FeCl_2.4H_2O$ and $CoCl_2.6H_2O$, and preparing aqueous solutions respectively having a $Fe^{2+}$ concentration of 0.5 mol/L and a $Co^{2+}$ concentration of 0.5 mol/L; respectively putting 100 ml of the two aqueous solutions into a three-necked flask, and adding 6 ml of a surface protecting agent of PVP having a concentration of 5 g/L into the three-necked flask; adding 3 g of $KBH_4$ into 100 ml of an NaOH aqueous solution having a pH value of 11.0-12.0, so as to prepare a mixed solution; dropping the mixed solution into the three-necked flask with a reaction temperature controlled at 55° C., a dropping speed controlled at 20 r/min by a peristaltic pump, and a stirring speed controlled at 400 r/min by a mechanical stirrer, and then generating a black precipitate; after finishing dropping the mixed solution of the $KBH_4$ and NaOH, continue stirring for 10 min, and aging for 1 h; and, after suction filtration, washing, and vacuum drying, obtaining a product of the iron-cobalt fenton-like catalyst.

A method for pretreating acrylic acid production wastewater with the product obtained by the above preparation method comprises steps of:

(1) weighing 400 ml of a water sample to be treated which is the acrylic acid production wastewater having a pH value of 5.0-6.0, and adjusting a pH value of the water sample to 2.0 with an $H_2SO_4$ solution;

(2) firstly adding 0.5 ml of an $H_2O_2$ solution having a content of 30% into the water sample, and then adding 1.1472 g of the iron-cobalt fenton-like catalyst into the water sample, so as to obtain a first mixed solution;

(3) fully mixing the first mixed solution with a stirring speed controlled at 400 r/min, controlling a pH value of the first mixed solution at a range of 2.0±0.5 with the $H_2SO_4$ solution during reacting, and reacting for 20 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent and a change of a $COD_{Cr}$ value in the water sample before and after treating is showed in Table 5.

TABLE 5

Quality of water sample before and after treating

| | $COD_{Cr}$ (mg/L) | $COD_{Cr}$ removal rate (%) |
|---|---|---|
| Before treating | 63349 | |
| After treating | 34982 | 44.8 |

Example 6

A preparation method of an iron-cobalt fenton-like catalyst comprises steps of: weighing a certain amount of $FeCl_2.4H_2O$ and $CoCl_2.6H_2O$, and preparing aqueous solutions respectively having a $Fe^{2+}$ concentration of 0.5 mol/L and a $Co^{2+}$ concentration of 0.5 mol/L; respectively putting 100 ml of the two aqueous solutions into a three-necked flask, and adding 10 ml of a surface protecting agent of PVP having a concentration of 5 g/L into the three-necked flask; adding 2 g of $KBH_4$ into 100 ml of an NaOH aqueous solution having a pH value of 11.0-12.0, so as to prepare a mixed solution; dropping the mixed solution into the three-necked flask with a reaction temperature controlled at 55° C., a dropping speed controlled at 30 r/min by a peristaltic pump, and a stirring speed controlled at 900 r/min by a mechanical stirrer, and then generating a black precipitate; after finishing dropping the mixed solution of the $KBH_4$ and NaOH, continue stirring for 40 min, and aging for 1 h; and, after suction filtration, washing, and vacuum drying, obtaining a product of the iron-cobalt fenton-like catalyst.

A method for pretreating acrylonitrile butadiene styrene (ABS) synthetic resin wastewater with the product obtained by the above preparation method comprises steps of:

(1) weighing 400 ml of a water sample to be treated which is the ABS synthetic resin wastewater having a pH value of 6.0-7.0, and adjusting a pH value of the water sample to 2.0 with an $H_2SO_4$ solution;

(2) firstly adding 0.4 ml of an $H_2O_2$ solution having a content of 30% into the water sample, and then adding 0.6740 g of the iron-cobalt fenton-like catalyst into the water sample, so as to obtain a first mixed solution;

(3) fully mixing the first mixed solution with a stirring speed controlled at 300 r/min, controlling a pH value of the first mixed solution at a range of 2.0±0.5 with the $H_2SO_4$ solution during reacting, and reacting for 5 min;

(4) adjusting a pH value of a second mixed solution obtained by the step (3) to being larger than or equal to 10.0 with an NaOH solution, and then heating an adjusted second mixed solution in a water bath at a temperature of 50° C. for 1 h; and (5) after cooling a third mixed solution obtained by the step (4), adjusting a pH value of the third mixed solution to 7.0 with the NaOH solution, and staying for precipitating, wherein a supernatant of a precipitated solution is a treated effluent and a change of a $COD_{Cr}$ value in the water sample before and after treating is showed in Table 6.

TABLE 6

Quality of water sample before and after treating

| | $COD_{Cr}$ (mg/L) | $COD_{Cr}$ removal rate (%) |
|---|---|---|
| Before treating | 1108 | |
| After treating | 698 | 37.0 |

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

INDUSTRIAL PRACTICABILITY

The iron-cobalt fenton-like catalyst and the preparation method thereof provided by the present invention have a relatively fast treatment speed. When treating the industrial wastewater, a relatively good treatment effect is achieved in a 10-min reaction time. Moreover, the catalyst has a relatively high treatment efficiency. When treating the industrial wastewater, the removal rate of the $COD_{Cr}$ in the acrylon wastewater with the advanced treatment is above 60%, and the removal rate of the $COD_{Cr}$ in the self-prepared dye wastewater is above 70%. Furthermore, the catalyst has a wide application range. The catalyst is applicable for not only the advanced treatment of the acrylon wastewater and the dye wastewater, but also the pretreatment and the advanced treatment of the petrochemical wastewater, the phenol-acetone production wastewater, the ABS synthetic resin wastewater, and the acrylic acid production wastewater. The catalyst has the wide market prospect and the strong industrial practicability.

What is claimed is:

1. A preparation method of an iron-cobalt fenton-like catalyst, comprising steps of: respectively preparing aqueous solutions of $FeCl_2.4H_2O$ and $CoCl_2.6H_2O$, wherein a molar concentration ratio of $Fe^{2+}$ to $Co^{2+}$ is 1:1-10:1; the $FeCl_2.4H_2O$ and the $CoCl_7.6H_2O$ serve as reaction precursors; adding 2-10 ml of polyvinyl pyrrolidone (PVP) having a concentration of 5 g/L, so as to obtain a first mixed solution I, wherein the PVP serves as a surface protecting agent; weighing 100 ml of deionized water, adding NaOH into the deionized water for adjusting a pH value of the deinoized water to 11.0-12.0, and then adding 1-5 g of $KBH_4$ to prepare a second mixed solution II, wherein the $KBH_4$ serves as a reaction reducing agent; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, stirring an obtained third mixed solution for 10-40 min, and aging for 0.5-2 h; and, after suction filtration, washing, and vacuum drying, obtaining the iron-cobalt fenton-like catalyst.

2. A method for treating industrial wastewater with an iron-cobalt fenton-like catalyst, comprising steps of:
  (1) collecting a wastewater sample to be treated, and adjusting a pH value of the wastewater sample to 2.0±0.1;
  (2) adding an $H_2O_2$ solution having a content of 30% into the wastewater sample, and then adding the iron-cobalt fenton-like catalyst into the wastewater sample, so as to obtain a mixed solution;
  (3) fully reacting the mixed solution with a stirring speed controlled at 200-400 r/min for 5-20 min, and controlling a pH value of the mixed solution at a range of 2.0±0.5 during reacting;
  (4) adjusting a pH value of a reacted solution to being larger than or equal to 10.0, and heating an adjusted solution in a water bath at a temperature of 50° C. for 0.5-1 h; and
  (5) adjusting a pH value of a heated solution to 7.0, and standing for precipitating, wherein a supernatant of a precipitated solution is a treated effluent.

3. The method for treating the industrial wastewater with the iron-cobalt fenton-like catalyst, as recited in claim 2, wherein: in the step (2), a volume ratio of the wastewater sample to the $H_2O_2$ solution is 500:1-1000:1, and a mass ratio of the iron-cobalt fenton-like catalyst to the $H_2O_2$ solution is 5:1-10:1.

4. The method for treating the industrial wastewater with the iron-cobalt fenton-like catalyst, as recited in claim 2, wherein: the industrial wastewater is acrylon wastewater, dye wastewater, petrochemical wastewater, phenol-acetone production wastewater, acrylonitrile butadiene styrene (ABS) synthetic resin wastewater, or acrylic acid production wastewater.

5. The method for treating the industrial wastewater with the iron-cobalt fenton-like catalyst, as recited in claim 3, wherein: the industrial wastewater is acrylon wastewater, dye wastewater, petrochemical wastewater, phenol-acetone production wastewater, acrylonitrile butadiene styrene (ABS) synthetic resin wastewater, or acrylic acid production wastewater.

6. The method for treating the industrial wastewater with the iron-cobalt fenton-like catalyst, as recited in claim 2, wherein the iron-cobalt fenton-like catalyst is prepared by following steps of: adopting $FeCl_2.4H_2O$ and $CoCl_2.6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining the iron-cobalt fenton-like catalyst.

7. The method for treating the industrial wastewater with the iron-cobalt fenton-like catalyst, as recited in claim 3, wherein the iron-cobalt fenton-like catalyst is prepared by following steps of: adopting $FeCl_2.4H_2O$ and $CoCl_2.6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining the iron-cobalt fenton-like catalyst.

8. The method for treating the industrial wastewater with the iron-cobalt fenton-like catalyst, as recited in claim 4, wherein the iron-cobalt fenton-like catalyst is prepared by following steps of: adopting $FeCl_2.4H_2O$ and $CoCl_2.6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining the iron-cobalt fenton-like catalyst.

9. The method for treating the industrial wastewater with the iron-cobalt fenton-like catalyst, as recited in claim 5, wherein the iron-cobalt fenton-like catalyst is prepared by following steps of: adopting $FeCl_2.4H_2O$ and $CoCl_2.6H_2O$ as reaction precursors, $KBH_4$ as a reaction reducing agent, and polyvinyl pyrrolidone (PVP) as a surface protecting agent; preparing with a liquid phase reduction method; and after aging, suction filtration, washing, and vacuum drying, obtaining the iron-cobalt fenton-like catalyst.

10. The method for treating the industrial wastewater with the iron-cobalt fenton-like catalyst, as recited in claim 2, wherein the iron-cobalt fenton-like catalyst is prepared by following steps of:
  respectively preparing aqueous solutions of $FeCl_2.4H_2O$ and $CoCl_2.6H_2O$, wherein a molar concentration ratio of $Fe^{2+}$ to $Co^{2+}$ is 1:1-10:1, and adding 2-10 ml of a surface protecting agent of polyvinyl pyrrolidone (PVP) having a concentration of 5 g/L, so as to obtain a first mixed solution I; weighing 100 ml of deionized water, adding NaOH into the deinoized water for adjusting a pH value of the deinoized water to 11.0-12.0, and then adding 1-5 g of $KBH_4$ to prepare a second mixed solution II; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, continue stirring for 10-40 min, and aging for 0.5-2 h; and, after suction filtration, washing, and vacuum drying, obtaining the iron-cobalt fenton-like catalyst.

11. The method for treating the industrial wastewater with the iron-cobalt fenton-like catalyst, as recited in claim 3, wherein the iron-cobalt fenton-like catalyst is prepared by following steps of:

respectively preparing aqueous solutions of $FeCl_2.4H_2O$ and $CoCl_2.6H_2O$, wherein a molar concentration ratio of $Fe^{2+}$ to $Co^{2+}$ is 1:1-10:1, and adding 2-10 ml of a surface protecting agent of polyvinyl pyrrolidone (PVP) having a concentration of 5 g/L, so as to obtain a first mixed solution I; weighing 100 ml of deionized water, adding NaOH into the deionized water for adjusting a pH value of the deinoized water to 11.0-12.0, and then adding 1-5 g of $KBH_4$ to prepare a second mixed solution II; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, continue stirring for 10-40 min, and aging for 0.5-2 h; and, after suction filtration, washing, and vacuum drying, obtaining the iron-cobalt fenton-like catalyst.

12. The method for treating the industrial wastewater with the iron-cobalt fenton-like catalyst, as recited in claim 4, wherein the iron-cobalt fenton-like catalyst is prepared by following steps of:

respectively preparing aqueous solutions of $FeCl_2.4H_2O$ and $CoCl_2.6H_2O$, wherein a molar concentration ratio of $Fe^{2+}$ to $Co^{2+}$ is 1:1-10:1, and adding 2-10 ml of a surface protecting agent of polyvinyl pyrrolidone (PVP) having a concentration of 5 g/L, so as to obtain a first mixed solution I; weighing 100 ml of deionized water, adding NaOH into the deionized water for adjusting a pH value of the deinoized water to 11.0-12.0, and then adding 1-5 g of $KBH_4$ to prepare a second mixed solution II; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, continue stirring for 10-40 min, and aging for 0.5-2 h; and, after suction filtration, washing, and vacuum drying, obtaining the iron-cobalt fenton-like catalyst.

13. The method for treating the industrial wastewater with the iron-cobalt fenton-like catalyst, as recited in claim 5, wherein the iron-cobalt fenton-like catalyst is prepared by following steps of:

respectively preparing aqueous solutions of $FeCl_2.4H_2O$ and $CoCl_2.6H_2O$, wherein a molar concentration ratio of $Fe^{2+}$ to $Co^{2+}$ is 1:1-10:1, and adding 2-10 ml of a surface protecting agent of polyvinyl pyrrolidone (PVP) having a concentration of 5 g/L, so as to obtain a first mixed solution I; weighing 100 ml of deionized water, adding NaOH into the deionized water for adjusting a pH value of the deinoized water to 11.0-12.0, and then adding 1-5 g of $KBH_4$ to prepare a second mixed solution II; dropping the second mixed solution II into the first mixed solution I with a reaction temperature controlled at 50±5° C., a dropping speed controlled at 15-50 r/min by a peristaltic pump, and a stirring speed controlled at 400-900 r/min by a mechanical stirrer, and then generating a black precipitate; after finishing dropping the second mixed solution II of the $KBH_4$ and the NaOH, continue stirring for 10-40 min, and aging for 0.5-2 h; and, after suction filtration, washing, and vacuum drying, obtaining the iron-cobalt fenton-like catalyst.

\* \* \* \* \*